United States Patent [19]

Lloyd et al.

[11] 4,222,497

[45] * Sep. 16, 1980

[54] SYSTEM AND METHOD FOR MONITORING AND MAINTAINING A PREDETERMINED CONCENTRATION OF MATERIAL IN A FLUID CARRIER

[75] Inventors: William A. Lloyd, San Jose; Herman Wong, Los Altos Hills; Keith E. McFarland, Woodside, all of Calif.

[73] Assignee: Xerox Corporation, Stamford, Conn.

[*] Notice: The portion of the term of this patent subsequent to Jul. 16, 1995, has been disclaimed.

[21] Appl. No.: 669,205

[22] Filed: Mar. 22, 1976

[51] Int. Cl.³ ............................................. B23Q 35/00
[52] U.S. Cl. ............................... 222/57; 222/DIG. 1; 222/161; 356/433; 118/689
[58] Field of Search ...................... 222/DIG. 1, 52, 56, 222/57, 76, 129, 161; 356/205, 206, 207, 208, 181, 433–436; 118/637, 689–691

[56] References Cited

U.S. PATENT DOCUMENTS

| | | | |
|---|---|---|---|
| 2,640,629 | 6/1953 | Thomson et al. | 222/161 |
| 2,791,932 | 5/1957 | Hall | 356/206 X |
| 3,354,802 | 11/1967 | Doucette et al. | 355/11 X |
| 3,377,988 | 4/1968 | Zawiski | 222/161 X |
| 3,494,328 | 2/1970 | Maloney | 222/DIG. 1 |
| 3,677,222 | 7/1972 | Komori et al. | 118/691 |
| 3,890,510 | 6/1975 | Sturm | 356/205 X |
| 3,926,145 | 12/1975 | Muth | 118/691 |
| 3,954,342 | 5/1976 | Boeke | 356/206 |
| 3,976,891 | 8/1976 | Parkinson | 356/207 X |
| 4,032,227 | 6/1977 | Hubbard et al. | 222/DIG. 1 |

Primary Examiner—Joseph J. Rolla
Attorney, Agent, or Firm—W. Douglas Carothers, Jr.

[57] ABSTRACT

A system and method for monitoring and maintaining a predetermined concentration of material in a fluid body or carrier includes a control arrangement for detecting the transmissivity of a flow cell in each of two states. One of the states during which the flow cell is observed contains substantially no fluid present therein but provides a basis for determining the degree of existence of external factors affecting measurements made via the flow cell. The measurements for one state are subtracted from the measurements for the other in order to determine the transmissivity of the fluid body itself as distinguished from the combination of fluid body and flow cell.

25 Claims, 7 Drawing Figures

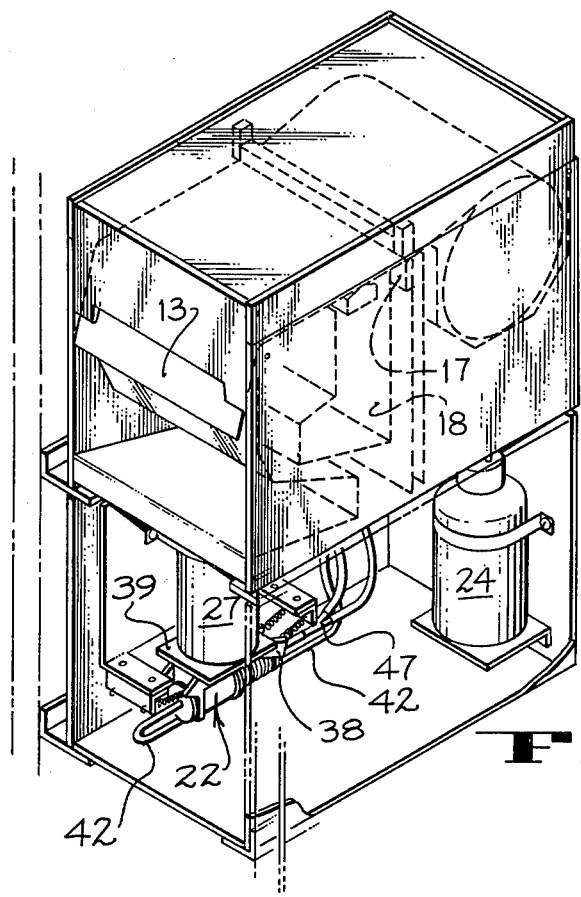
FIG_1
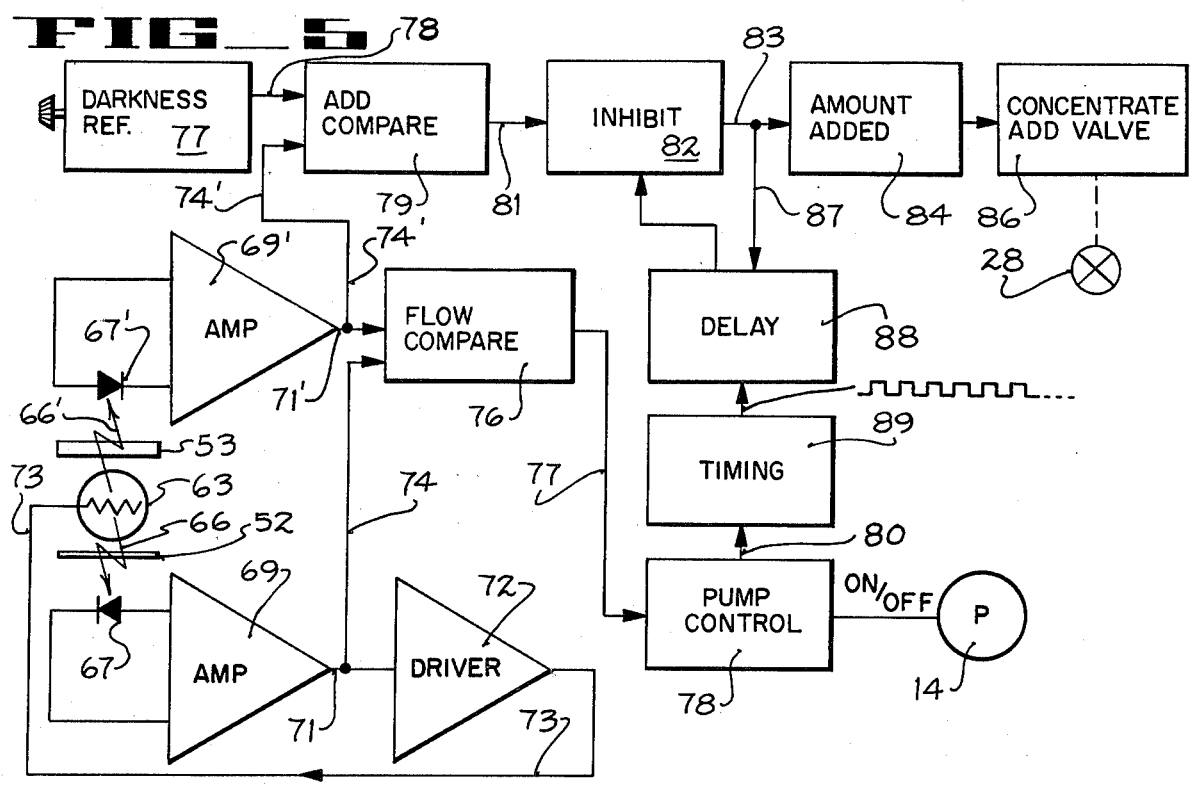
FIG_5

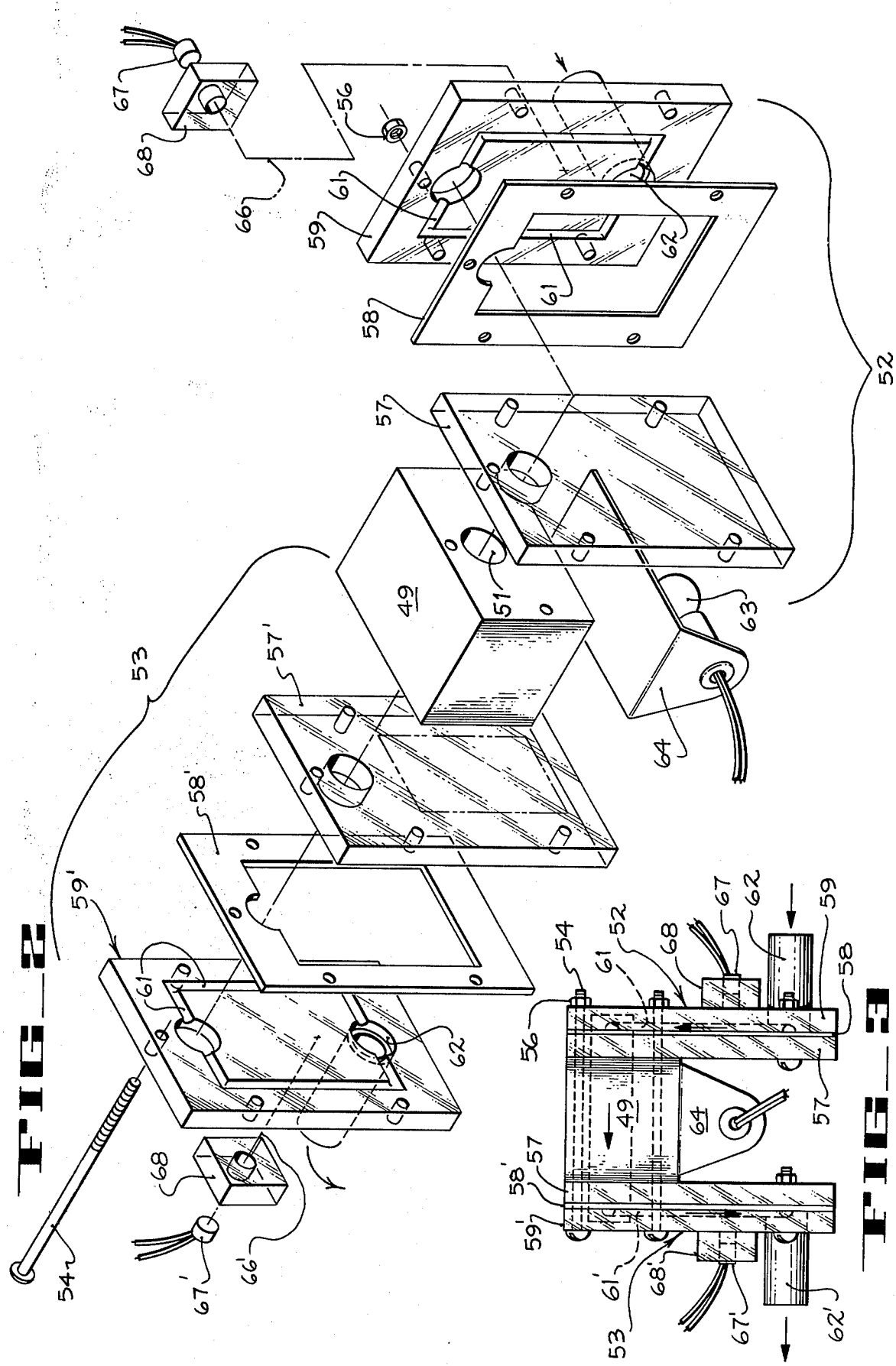

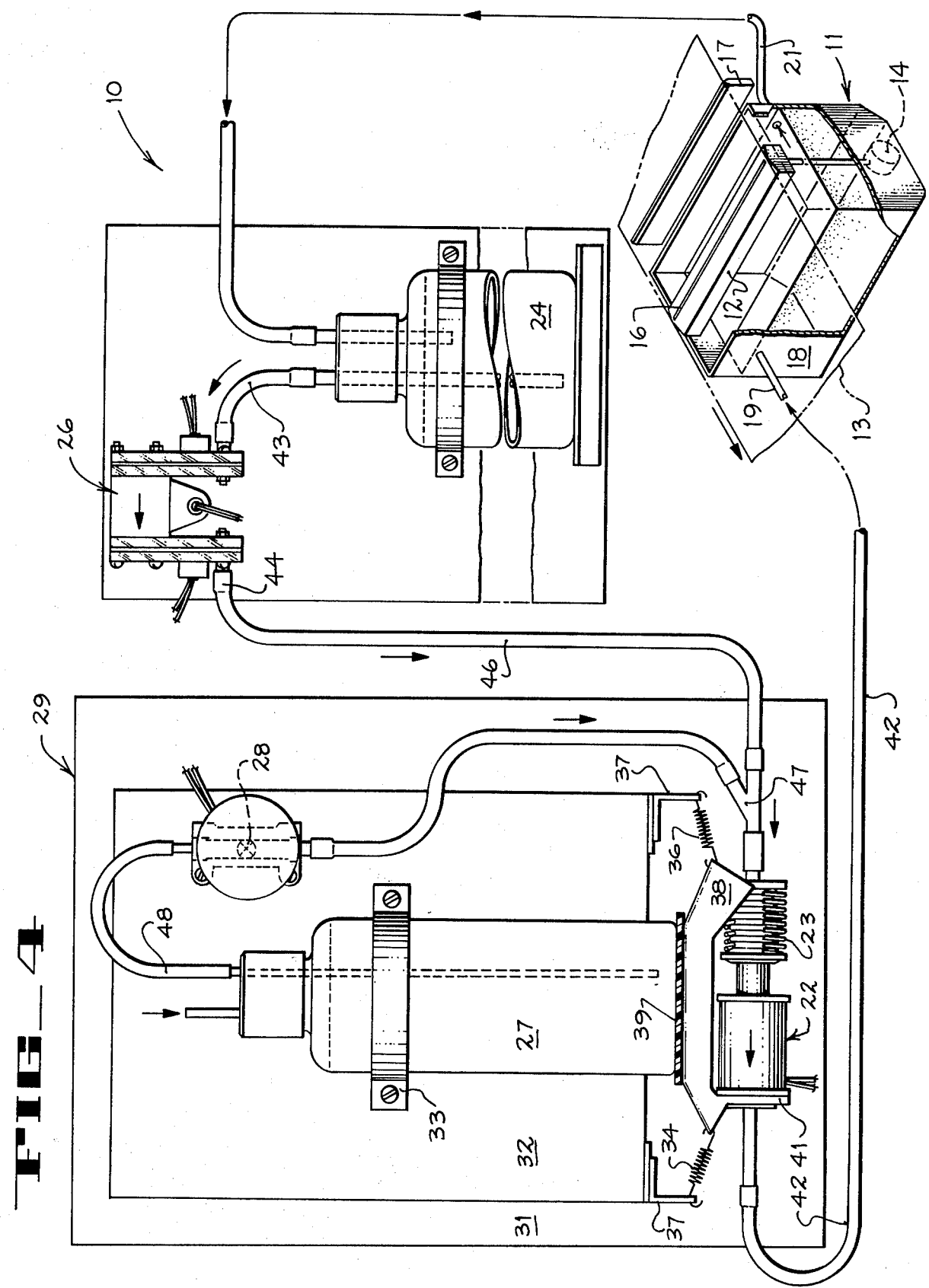

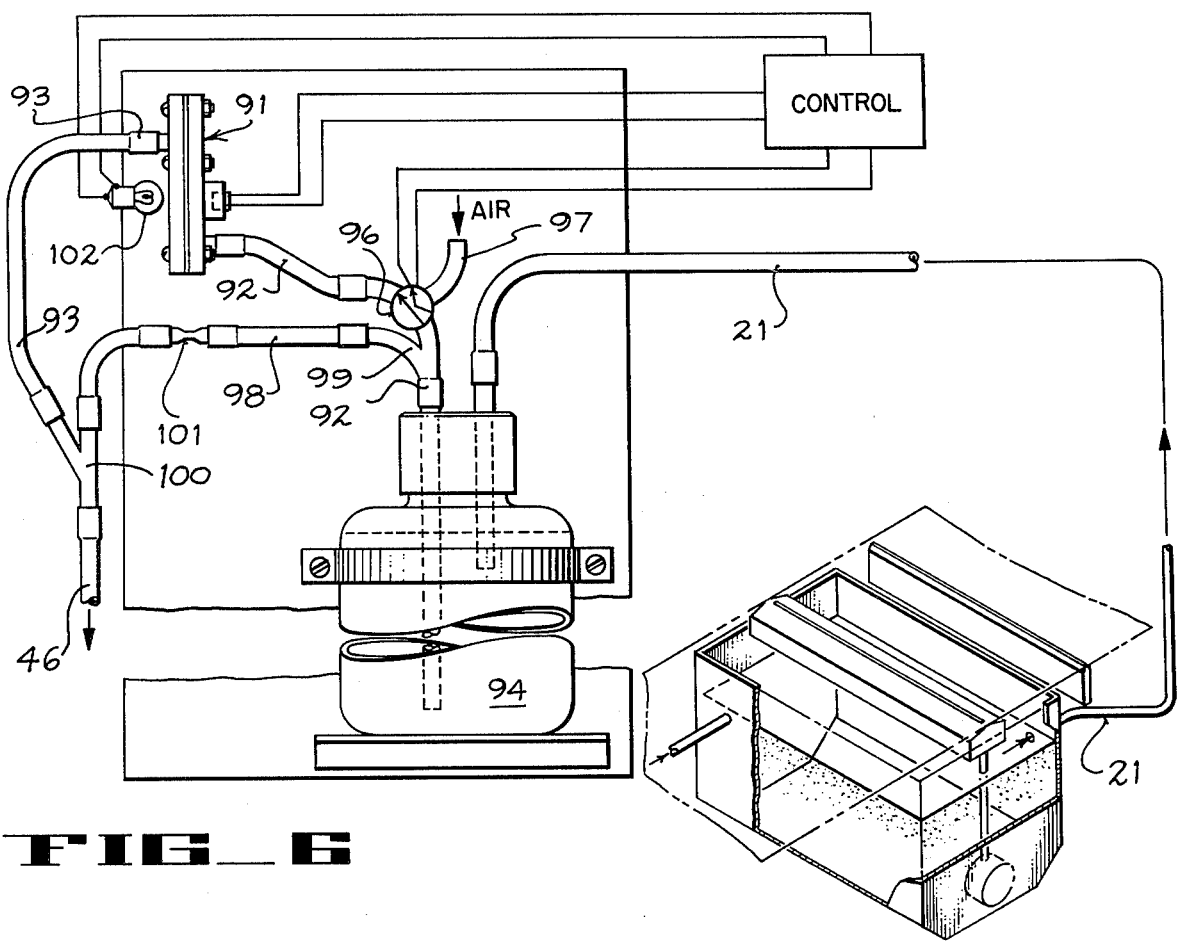
FIG_6
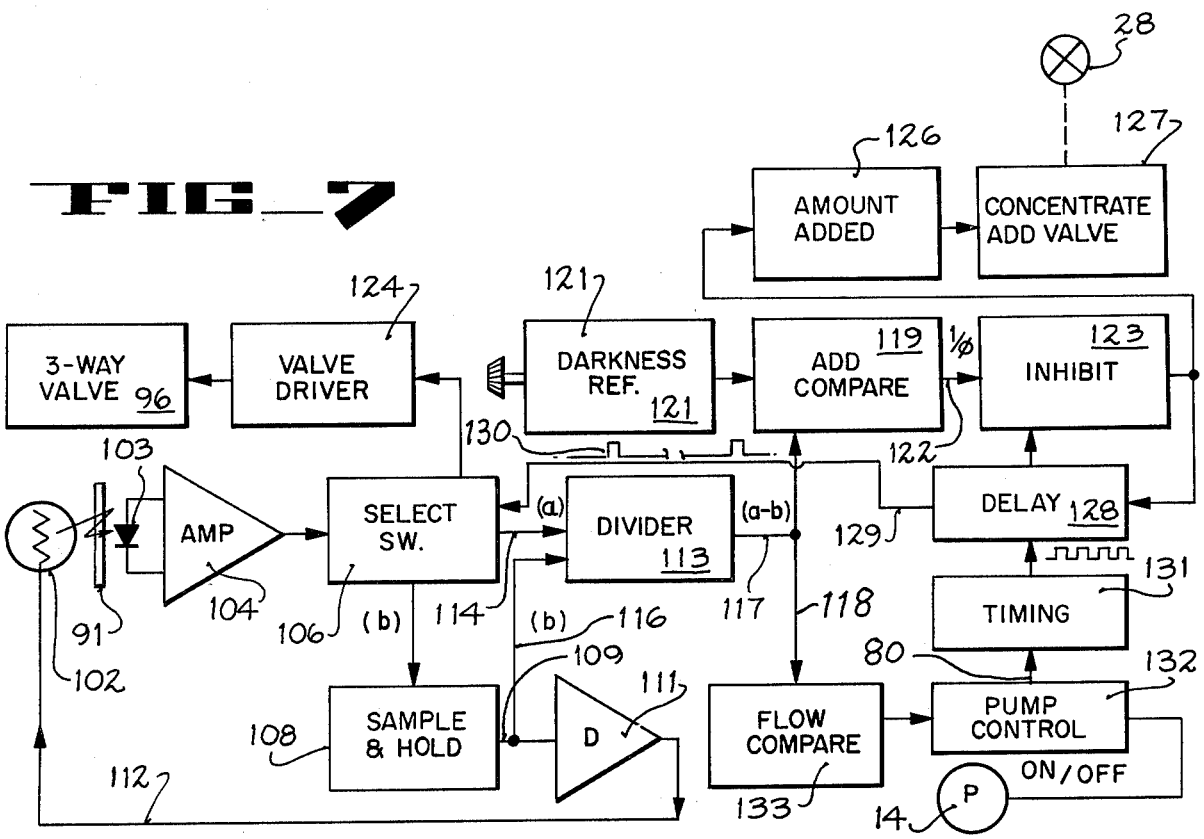
FIG_7

SYSTEM AND METHOD FOR MONITORING AND MAINTAINING A PREDETERMINED CONCENTRATION OF MATERIAL IN A FLUID CARRIER

BACKGROUND OF THE INVENTION

This invention pertains to a system for automatically adjusting the concentration of any material carried in a body of fluid and is particularly useful for maintaining a predetermined concentration of toner material suspended in a liquid carrier for use in a printing system of a type wherein toner particles become adhered to paper or other receiving material so that during printing the concentration of toner particles in the liquid body diminishes simply by consumption of very small amounts of the toner from the liquid body with each printing.

Heretofore, the problem of maintaining a proper level of darkness in a printing system has been typically solved simply by inspection of the quality of the print which is being produced at a given time. If the print is too light then additional toner concentrate is added by the operator of the machine until the darkness is appropriately established.

The foregoing manner of adjusting the darkness level of print in a toner printing system suffers from a number of drawbacks and accordingly there has been a need for a system in which the toner remains automatically properly adjusted to an appropriate level of darkness and in which the darkness level can be increased or decreased as desired without upsetting the manner of operating the system.

OBJECTS AND SUMMARY OF THE INVENTION

In general a system for monitoring the concentration of a material carried in a fluid body includes means for circulating the fluid body within a substantially closed loop system and means for measuring the concentration of material carried in the fluid. The last named means includes means measuring, under each of two conditions, the transmissivity of the fluid body and an associated flow cell. One of the two conditions provides a relatively long energy path in the fluid body relative to a short energy path in the fluid body for the other condition. Means are provided for establishing a predetermined standard of measurement for a desired concentration of the material in the fluid and means for detecting disparity between the standard of measurement and the measured concentration of the material so as to indicate the need for material to be added to the fluid body. Means are also provided for adding material to the fluid body and again monitoring the transmissivity of the fluid body to determine the need to add more such material.

The method of monitoring the concentration of a material carried in a fluid body has also been provided utilizing the steps as they are recited further below.

In general it is an object of the present invention to provide an improved system and method for monitoring and also for maintaining a predetermined concentration of material in a fluid body.

It is another object of the invention to provide a system of the foregoing kind in which transmissivity measurements taken through the fluid body as contained in a flow cell can be employed in a manner whereby error factors (which would otherwise cause improper meaurements of the transmissivity of the fluid body) can be subtracted out of such measurements to provide an accurate measure of the transmissivity of the fluid body itself.

It is a further object of the present invention to provide an improved flow cell assembly.

It is a further object of the present invention to provide an improved means for disposing a storage of make-up concentrate material to be added to the fluid body in a manner whereby the make-up concentrate is regularly stirred.

The foregoing and other objects of the present invention will become readily apparent from the following detailed description of preferred embodiments when considered in conjunction with the drawings.

BRIEF DESCRIPTION OF THE DRAWINGS

FIG. 1 shows a diagramatic perspective view of a printing system according to the invention;

FIG. 2 shows a diagramatic exploded perspective view of a flow cell assembly as shown in FIG. 3;

FIG. 3 shows an elevation view of a flow cell assembly according to the invention;

FIG. 4 shows a digramatic elevation view, with portions in perspective, of a system for monitoring and maintaining a predetermined concentration of material in a fluid body, according to the invention;

FIG. 5 shows a diagramatic block diagram view of a control system for operating the system shown in FIG. 4;

FIG. 6 shows a diagramatic elevation view, with portions shown in perspective, of a system according to another embodiment of the invention;

FIG. 7 shows a diagramatic block diagram view of a control system for controlling the system shown in FIG. 6.

DETAILED DESCRIPTION OF PREFERRED EMBODIMENTS

While the present invention is applicable to various systems in which the concentration of a material carried in a fluid body is required to be monitored or to be both monitored and adjusted to be maintained at a particular level of concentration represented by its transmissivity, the present invention is described in a system for printing with a liquid toner onto a moving web or sheet.

Accordingly a system 10 as shown in FIG. 4 discloses a toner fountain assembly 11 in which a toner head assembly 12 is carried transversely of the path of a web 13 of print material, such as paper. A pump 14 continuously supplies a mixture of toner material and a fluid body upwardly into head assembly 12 for discharge out of head assembly along the gap 16 so as to apply toner against web 13 to develop latent electrostatic characters applied by means of the head 17. The fluid body and toner material therein are contained in the reservoir 18. Flow passages 19, 21 pass the fluid body and toner material into and out of reservoir 18 and maintain the fluid level therein at a predetermined height.

The shape of reservoir 18 in FIG. 4 differs from that of reservoir 18 in FIG. 1 for purposes of clarity in explaining the system of FIG. 4.

Means for circulating the fluid body (and the toner material carried by the body) throughout the system includes a reciprocating pump 22 which includes a reciprocating drive piston operated in one direction by a solenoid and in the other direction by means of the spring 23, all of conventional design.

In general, the remainder of the system described with regard to FIG. 4 includes a fluid storage container 24 and a flow cell assembly 26, a toner concentrate supply container 27, and a valve 28 serving to control the discharge of toner concentrate from supply 27. Finally an electronic control system as shown in FIG. 5 serves to operate the system shown in FIG. 4 so as to maintain the level of concentration of toner in the system at a predetermined level.

In general, a toner concentrate supply assembly 29 carried on a mounting plate 31 includes the toner concentrate supply container 27 secured to an associated support plate 32 by means of a strap 33. Plates 32 and 31 are secured together in conventional style. Beneath support plate 32 springs 34, 36 engage (at their outer ends) downwardly depending angle bar flanges 37 and (at their inner ends) springs 34, 36 engage and support in yielding relation a bottom plate holder 38 carrying bottom plate 39 for supporting container 27 and also holding pump assembly 22 retained in a collar 41 so that the vibrations created by pump 22 serve to regularly vibrate and stir the contents of supply container 27.

Pump 22 accordingly serves to pump a fluid body containing toner material therein along a path defined by the arrow on pump 22 along flow passage 42 and into reservoir 18 via flow passage 19. The discharge side of reservoir 18 via flow passage 21 is fed into storage container 24. The discharge flow passage 43 transports the fluid body out of storage container 24 and into a flow cell assembly 26 as best shown in FIGS. 2 and 3 for purposes of monitoring the toner material in the fluid body.

A flow passage 44 on the outlet side of assembly 26 is connected to a line 46 which leads back to pump 22.

However, a junction 47 connects into line 46 and leads to valve 28 which in turn, via line 48 connects into container 27 for introducing the toner concentrate into the cyclic flow path via junction 47 when valve 28 has been directed to be disposed to an open position.

Flow cell assembly 26, shown in detail in FIG. 2, includes a mounting body 49 of suitable material, such as aluminum or other rigid material. A port 51 formed through body 49 serves to pass fluid therethrough in relatively large quantities.

A pair of flow cells 52, 53 are carried by body 49 by suitable attaching means such as the bolts 54 provided with a nut 56 to be secured to the end thereof after passing through components not to be described, and body 49.

Flow cells 52, 53 each comprise a pair of parallel spaced transparent sidewalls together with means for maintaining the sidewalls of each flow cell spaced apart in sealed relation to receive fluid in the spacing between the side walls. Further, means are provided for passing fluid into and out of the spacing between the walls of each flow cell successively in series flow relation to privide first and second contained bodies of fluid in the flow cells respectively as defined between the sidewalls thereof.

Thus, flow cell 52 includes a transparent panel 57, a gasket 58 of relatively incompressible and noncorrosive mateial to be applied in face to face relation with respect to the face of panel 57. Another transparent panel 59 includes diversion channels 61 formed in its face in fluid communication with an inlet flow passage 62. Panel 59 is secured to the opposite side of gasket 58 whereby upon assembly, gasket 58 flanked by panels 57 and 59 serves to define a contained body or layer of fluid and to define a cell having confronting transparent walls defined by the panels 57, 59 with the thickness of the cell defined by the thickness of gasket 58.

A substantial portion of the flow of fluid through cell 52 is diverted by means of diversion channels 61 and only a minimum thickness laminar of flowing fluid appears between the confronting walls of panels 57, 59.

Cell 53 is constructed substantially in a similar manner as cell 52 with the exception that the thickness of gasket 58' is considerably thicker than the relatively thin gasket 58 (which is shown in FIG. 2 as having a thickness substantially greater than it would actually have).

It has been observed that it is preferable to provide a gasket thickness for gasket 58 which is of the order of 0.007 inches, whereas the gasket 58' should be of the order of 0.032 inches.

Accordingly, the contained body of fluid within gasket 58 is sufficiently thin whereby the light passing from a light source 63 therethrough remains substantially unabsorbed by the presence of the contained body of fluid.

Light source 63, carried by an L-shaped bracket 64 secured to the bottom of body 49 as by means of glue or other adhesive material serves to project light through panel 57, the limited amount of fluid defined within the boundary of gasket 58 and through panel 59 along the light path 66 to a photo responsive element 67, such as a photodiode or the like to provide means for detecting the light transmitted via the contained body within gasket 58.

Means are provided also for detecting the light transmitted via another contained body defined within gasket 58' in a similar manner in which the parts thereof have been designated by the reference numbers as heretofore but with the addition of prime marks (') attached thereto.

It is to be observed that as noted above, gasket 58' is considerably thicker than gasket 58. Accordingly, light path 66' passes through a relatively thick body of fluid so that the absorbency of the light path along path 66 is considerably less than the absorbency of the light transmitted via light path 66'.

It has been observed that certain "external factors" prevent the transmissivity of the fluid body being measured directly by means of a light responsive device, such as the photodiodes or other light responsive devices. For example, heretofore it has been difficult to determine the degree to which the responsiveness of the photodiode if affected by means of heat from the light source or by the accumulation of contamination on the surface of the transparent flow cell through which the fluid body is passing, or the particular level of illumination of the light source at the time of determining the transmissivity through the flow cell. These and other "external factors", i.e., factors other than the actual transmissivity of the fluid body itself, must be eliminated or substantially minimized in order to provide a relatively accurate reading as to the actual concentration of material in a given fluid body.

In general, changes in the actual concentration of the fluid body will result from consumption of the material out of the fluid body, as where toner is used to print onto paper or the like.

Changes in the measured concentration can be caused by aging of an energy source such as bulbs used in measuring the transmissivity via flow cell 53 and fluid therein. The transparency of flow cell 53 itself varies and introduces a changing condition with respect to measuring the transmissivity of the combined flow cell and fluid therein since flow cell 53 (and flow cell 52) becomes increasingly stained during use.

It has been observed that a common series flow connection through each of the two flow cells 52, 53 stains the transparent walls of these cells at substantially the same rate. Also, as noted herein the thickness of the fluid in cell 52 is sufficiently thin as to permit the transmissivity to be substantially unaffected by the fluid flowing through it. Thus, as the transmissivity via flow cell 52 diminishes it can be assumed that the "external factors" of staining, energy source aging, thermal affects on photodiodes 67, 67', etc. have caused the loss, since the fluid is not a factor.

To compensate for this loss in transmissivity the energy source 63 is increased proportionately thereby optically "subtracting" losses caused by "external factors" from the measured output of flow cell 53 thereby providing a true indication of the transmissivity of the fluid itself in cell 53.

This value is then compared to a standard selected by the darkness reference curcuit 77.

Thus, by optically and electronically increasing the intensity of light source 63 in relation to the existance of the "external factors" (i.e., "external to the fluid body") at flow cell 52 corresponding to those same external factors at flow cell 53, the output signal from diode 67', compensates for, i.e., eliminates or subtracts the effect of the same external factors at cell 53 and will, therefore, vary only with respect to changes in the concentration of the material in the fluid body itself.

Accordingly, it has been observed that each of the two flow cell components of flow cell assembly 26 will become contaminated at substantially the same rate notwithstanding their differing volumes and even though the contained body of fluid in flow cell unit 52 is sufficiently thin whereby the light passing therethrough remains substantially unabsorbed by the presence of the contained body of fluid therein.

As disclosed further below, means are provided for maintaining a level of illumination on light source 63 as measured through flow cell unit 52 so as to compensate for deterioration of the source 63, increasing contamination of the flow cell walls, and other "external factors".

In general, means are provided for detecting the transmissivity of light passing through each of the two flow cell units 52, 53 and means are further provided for subtracting a measure of the transmissivity of the light passing via one of the flow cells from a measure of the transmissivity of the light passing via the other of the flow cells so as to provide a measure of the transmissivity of the fluid body itself.

Accordingly, as shown diagramatically in FIG. 5, a system has been arranged providing the foregoing functions and comparisons. As noted above, light source 63 projects light via each of flow cells 52, 53 along their respective light paths 66, 66' and onto a photodiode 67, 67'. Each of diodes 67, 67' is disposed in circuit with an amplifier 69, 69' whereby the photodiode response is inverted and amplified onto output leads 71, 71'.

Accordingly, if the light response through flow cell 52 is low due to high contamination or due to the age of the light source 63, the response from diode 67 will be less and the inverted output from amplifier 69 will be greater as it appears on its outpu lead 71. This output is directly amplified by a driver circuit 72 so as to transmit the output from driver circuit 72 via lead 73 to increase the illumination from light source 63.

It has been observed that by disposing photodiodes 67 and the flow cell units 52, 53 in a substantially symmetrical manner around opposite sides of light source 63, any heat distortion of the transmissivity readings caused by the heat from light source 63 will be substantially equal on opposite sides of the system and will be nullified.

The transmissivity response registered by the voltage level at output lead 71 is applied via lead 74 to a comparator circuit 76 together with the input from lead 71'. The output on lead 71' is applied to lead 74' which is coupled to a flow comparator circuit 76.

Flow comparator 76 is arranged to insure discontinued pumping of the fluid body throughout the system in the event that the transmissivity of unit 53 approximates the transmissivity of unit 52 thereby indicating either that no fluid is actually being received into unit 53 or that unit 53 is being pumped with bubles or other highly transmissive material. Accordingly, the flow comparator circuit 76 serves as a safety over-ride function and by comparing the inputs from leads 74 and 74' can determine when the foregoing adverse condition exists. Upon detecting the existence of the foregoing condition flow comparator 76 generates a suitable control signal onto lead 77 into a pump control circuit 78 which serves to deenergize pump 14.

In general, and assuming that the foregoing circumstance does not exist the system as disclosed in FIG. 5 operates generally in a manner whereby the output on 71' will vary in response to changes in the concentration of material carried in the fluid body. Thus, a direct comparison of the output voltage on 71' (via lead 74') can be made with respect to a predetermined selected voltage level provided from an adjustable darkness reference circuit 77 on lead 78. By being able to make a direct comparison the comparing function is more easily and simply handled to detect the level of concentration in the fluid body.

Thus, by optically increasing the intensity of light source 63 in relation to the existence of "external factors" at flow cell 52 which correspond to the same "external factors" at flow cell 53, the output signal from diode 67' compensates for, i.e., eliminates or subtracts the effect of the same "external factors" acting on cells 52, 53 and will vary only with respect to changes in the concentration of the toner material in the fluid body.

Accordingly, a comparator circuit 79 serves to compare the inputs from leads 74' and 78 and provides an output signal on lead 81 only in the event that additional material is required to be added to the system. In the event that such an "add compare" signal is present on lead 81 the signal is sensed directly through the inhibit circuit 82 and appears on lead 83. The signal on Lead 83 serves two functions. The first function is to activate an "amount added" circuit 84 which in turn activates for a predetermined time the electronics represented by the concentrate add valve 86 for operating valve 28 (FIG. 4). Amount added circuit 84 provides a predetermined time activation for concentrate add valve 86 so that the amount of material which is added to the fluid body in the system is uniform for each addition which is made to the system.

The other function of the signal on lead 83 is to activate via lead 87 a suitable delay circuit 88 which operates the inhibit circuit 82 to prevent any additional activation of the concentrate add valve during the period in which the concentrate add valve 86 is being operated. For example, delay circuit 88 can delay any further activation of valve 28 typically for a period on the order of one minute. During this time inhibit circuit 82 serves to preclude further transmission to circuits 84, 86. Inhibit circuit 82 can, for example, be a flip-flop circuit that can be disconnected from the standpoint of further transmitting additional signals to the amount added circuit 84.

A timing circuit 89 provides an output pulse train providing pulses at a rate on the order of 0.25 seconds, for example, which serve, for example, to activate inhibit circuit 82 at predetermined intervals unless overridden by the function of delay circuit 88 noted above.

In short, timing circuit 89 permits the system to check and make comparisons at predetermined intervals established by timing circuit 89 to determine whether or not additional material should be added to the fluid body in the system. Also, delay 88 prevents the system from making an operative comparison before the added concentrate has had a chance to circulate and mix with the fluid body.

For purposes of starting the systems into operation, a control switch (not shown) associated with pump control electronics 78 is turned "ON" so as to start the pump. As this switch is turned on an output at lead 80 activates the timing circuit 89.

From the foregoing it will be readily evident that the method of monitoring the concentration of a material carried in a fluid body is carried out by the steps of feeding the fluid body and the material therein into and out of flow cell means, measureing energy transmitted via the flow cell means in each of two states, the states being characterized by greater and lesser volumes of the fluid body present within the flow cell means. Then the measured results for one state are subtracted from the measured results for the other so as to provide an indication of the concentration of the material in the fluid body by adjusting the conditions providing measured results for the one state.

According to another embodiment as shown in FIGS. 6 and 7 there is provided a system for monitoring the concentration of a material carried in a fluid in which a flow cell 91 constructed in the manner of flow cell 53 includes flow passages 92, 93 passing fluid into and out of the flow cell 91. A supply reservoir 94 for containing a fluid body and the material, such as toner, therein supplies the same to the flow cell 91.

Flow passage 93 discharges fluid into line 46 via junction 100 whereby the remainder of the embodiment shown in FIG. 6 includes the portions of the first embodiment described above, with the exception that the flow cell assembly of FIG. 6 and the control circuitry of FIG. 7 have replaced flow cell assembly 26 of FIG. 4 and the control system of FIG. 5, although many of the functions remain the same as described above expecially with respect to FIGS. 5 and 7.

A valve 96 disposed in flow passage 92 operates between first and second conditions to couple flow cell 91 to reservoir 94 in its first condition and to couple flow cell 91 to atmosphere via vent 97 in its second condition. The valve serves to block flow through it to flow cell 91 when in its second condition so that flow cell 91 will be vented to be drained by the suction applied along flow passage 93 in response to the flow of fluid pumped along a third flow passage 98 extending between the junction 99 and the second flow passage 93 for feeding the fluid from the reservoir 94 to line 46.

Accordingly, the flow of fluid into line 46 via junction 100 when valve 96 is in its venting position serves to quickly drain the contents of flow cell 91.

In addition to the above, flow passage 98 includes a flow restricting means 101 serving to constrict the flow of the fluid from flow passage 92 to junction 100.

Means are provided as are now to be described for detecting a disparity between a measure of the concentration of material in the fluid and a selected predetermined measure thereof serving to couple the supply of concentrate to be fed into the system.

In general, in order to detect an unusually low concentration of toner in a given body of printing fluid, measurement of the density or darkness condition observed through the flow cell when empty is first detected. A second measurement, observed through the flow cell when fluid is being pumped through it, is later detected. Then, by subtracting the first measurement from the second, the density of only the fluid in the flow cell can be determined.

Since the voltage read-out obtained from sensing the condition of the flow cell when it is empty provides a non-linear output signal, it has been observed that a more reliable comparison of observed conditions is achieved if these non-linear outputs are converted to their respective logarithmic values and then their anti-logarithmic values are subtracted so as to remove density variations of the window coatings, lamp deteriorations, and temperature fluctuations from the "combined" value derived from examining the window when filled.

A control system for operating the embodiment shown in FIG. 6 appears in FIG. 7 and includes the light source 102 transmitting energy in the form of light energy onto the light responsive diode 103 via flow cell 91 in its evacuated or drained condition. The output from diode 103 is amplified by amplifier 104 and fed to a selector switch 106 whereby the voltage level of the evacuated flow cell 91 is stored in a sample and hold circuit 108 via lead 107. The storage life for this voltage input is substantial and can be achieved, for example, by a capacitor with a high impedance input. Subsequently, the voltage level for the evacuated flow cell 91 will appear on lead 109 to be amplified by a driver 111 whereby the driver is connected by lead 112 to light source 102. After flow cell 91 has been filled by the fluid which is to be monitored a second output from selector switch 106 can be achieved by transmitting the energy from light source 102 via flow cell 91, now in its filled condition, and this measurement or value can be fed directly via switch 106 to divider 113.

Accordingly, at this point divider 113 will be receiving a false indication as to the transmissivity of the fluid in the flow cell 91 due to the fact that the "external factors" (such as the age of the light source 102 and the contamination of sidewalls in flow cell 91 and the like) can serve to provide a false indication as to the concentration of material in the fluid.

However, by subtracting out the external factors from the reading being fed to divider 113 along lead 114 it is possible to provide a substantially accurate measurement of the concentration of material in the fluid body being monitored.

Accordingly, via lead 116, the stored value in sample and hold circuit 108 representative of the empty condition of flow cell 91 can be entered into divider 113 along with the value of the readout provided by a filled flow cell on lead 114 whereby the divider can, by conventional means, serve to subtract one from the other.

It has been observed that it is advantageous to subtract the logarhythms of these values and to use this result as the measure of concentration of material in the fluid body rather than to directly subtract the actual measured amounts. Accordingly, divider 113 is conventionally arranged to subtract the log of the value on lead 116 from the log of the value on lead 114 and provide an output corresponding to the subtraction on lead 117.

The output on lead 117 represents substantially the value of the concentration of material in the fluid body and accordingly is fed via lead 118 to the add compare circuit 119. The adjustable darkness reference 121 provides a second input to the add compare circuit 119 to provide a digital output representing whether or not the comparison is sufficiently close to refrain from adding additional toner concentrate or whether the comparison is sufficiently remote as to require the addition of concentrate to be added. Accordingly, a 1/0 is shown on output lead 122 leading to inhibit circuit 123.

During the time that selector switch 106 is conditioned to feed the output from diode amplifier 104 to sample and hold circuit 108, switch 106 also operates a valve driver circuit 124 which operates the electronics for the three-way valve 96 so as to connect vent 97 to flow cell 91 whereby flow cell 91 can be quickly drained and a reading taken as to the empty condition of flow cell 91.

In the event that the add compare circuit 119 indicates that material is to be added to the fluid body in the system a positive output will appear on line 122 to operate a flip-flop in the inhibit circuit 123 so as to trigger the amount added circuit 126. The activation of the amount added circuit 126 serves to operate the concentrate add valve electronics 127 so as to open the concentrate adding valve 28.

At the same time the output from inhibit 123 serves to trigger the delay input for circuit 128 to delay further adding of concentrate for approximately a minute and at the same time this serves to provide an output pulse on lead 129 which is connected to selector switch 106. The pulse 130 is generated at relatively infrequent intervals and lasts for a relatively prolonged period of time on the order, for example, of five seconds or perhaps even up to a minute.

At the same time a timing circuit 131 serves to provide a pulse train having, for example, quarter second pulses entering delay circuit 128 for purposes as described above. Similarly, the pump control circuit 132 is coupled to a flow compare circuit 133 so as to inactivate pump 14 whenever the value on lead 118 approaches a predetermined value established in the compare circuit 133.

What is claimed is:

1. In a system for monitoring and maintaining a predetermined concentration of a material carried in a fluid body comprising fluid receiving flow cell means, means for feeding the material and fluid together into and out of said flow cell means, means for establishing first and second volumetric conditions taken from said fluid body in said flow cell means, energy source means for transmitting energy via fluid in said flow cell means during each of said conditions, and means for detecting the degree of transmission through said flow cell means to define first and second levels of transmission via said flow cell means under said establsihed conditions, means for correlating one of said levels relative to the other to provide a first measure of the concentration of said material in said fluid body, means for establishing a predetermined standard measure for a desired concentration of said material in said fluids, and means for adding additional material into said body in response to detecting a predetermined disparity between said first and said standard measures.

2. In a system according to claim 1 in which the last named means includes a container for holding a supply of said material and in which said means for feeding includes a pump which provides vibrations, said container being carried by said pump whereby the vibrations of said pump serve to stir said supply of material.

3. In a system for monitoring and maintaining a predetermined concentration of a material carried in a fluid body comprising first and second flow cells, the second flow cell having a substantially greater volume than the first flow cell, means for feeding the material and fluid together into and out of said flow cells, means for transmitting energy via said fluid in each of said flow cells, means for detecting the degree of each such transmission to detect first and second levels of transmission respectively, means for correlating one of said levels from the other to provide a first measure of the concentration of said material and said fluid body, means for establishing a pre-selected standard measure of concentration of said material, means for adding material into said body in response to detecting a predetermined disparity between said first measure and said standard measure.

4. In a system according to claim 3 in which the energy path via the fluid in said first flow cell is sufficiently small in cross-sectional thickness so as to provide a measure of the transmissivity of said first flow cell substantially unaffected by the presence of said fluid therein.

5. In a system for monitoring and maintaining a predetermined concentration of a material carried in a fluid body according to claim 3 in which said first and second flow cells are coupled in series flow and spaced relation, and a light source common to both said flow cells providing energy to be transmitted via the fluid in each of said flow cells.

6. In a system according to claim 5 comprising means responsive to the energy transmitted via said first flow cell serving to maintain said light source at a predetermined illumination as detected via said first flow cell.

7. In a system for monitoring and controlling the concentration of a liquid developer solution, which includes a liquid toner concentrate material and a liquid body, the proportion of said material in said liquid body to be maintained substantially at a predetermined concentration, comprising:

A. first and second flow cells, one of said flow cells having a greater volumetric capacity than the other of said cells;
B. means for feeding the developer solution through said cells;
C. a source of light directed through said cells and the solution contained therein;
D. means for generating, respectively, first and second output signals proportional to the amount of light transmitted through said cells;
E. means employing one of said output signals to compensate for transmissivity differences between said flow cells and provide a signal corresponding to the actual transmissivity of the developer solution;

F. means for generating a reference signal corresponding to the preselected developer solution concentration;

G. means for comparing said actual transmissivity signal with said reference signal and generating a signal proportional to the difference therebetween;

H. servo means operable for adding toner concentrate material to said liquid body in response to said difference signal; and I. means for periodically enabling said servo means.

8. In a system according to claim 7 wherein said periodic enabling means is operated for a predetermined period of time per each activation thereof.

9. In a system according to claim 7 wherein there is provided means to inhibit further operation of said periodic enabling means after being initially activated.

10. In a system according to claim 7 wherein there is means to prevent additional activation of said periodic enabling means for a predetermined period of time after previous activation.

11. In a system according to claim 7 wherein there is included means to compare said first output signal with said second output signal to produce a signal proportional to the difference thereof and means to cease the feeding of said developer solution when said signal approximates no difference therebetween.

12. In a system according to claim 7 wherein said compensating means comprises means to change the intensity of said light source.

13. In a system for monitoring the concentration of a material carried in a fluid, a flow cell having first and second flow passages respectively for passing said fluid into and out of said cell, a supply reservoir for containing said fluid body and material for supplying same through said flow cell, a valve in said first flow passage operable between first and second conditions to couple said flow cell to said supply reservoir in said first condition and to couple said flow cell to atmosphere in said second condition, said valve serving to block flow therethrough to said flow cell when in said second condition, a flow-dividing junction disposed in said first flow passage between said valve and said reservoir, a third flow passage extending between said junction and said second flow passage for feeding said fluid from said reservoir to said second flow passage, means for transmitting energy via said flow cell in the two states thereof respectively when said flow cell is filled with said fluid and when said flow cell has been drained, means for providing a measure of the transmissivity via said cell in each of said states, means serving to subtract said mesure of transmissivity for the state when said flow cell is drained from said measure for the state when said flow cell is filled to provide a measure of transmissivity of said fluid.

14. In a system according to claim 13 further including means for containing a supply of concentrate of said material to be added to said fluid body, means for detecting a disparity between said measure of said fluid and a selected predetermined measure thereof serving to couple said supply of concentrate to be fed into said system to increase the concentration of said material in said fluid body.

15. In a system according to claim 13 in which said third flow passage includes a flow restricting means serving to divide the flow of said fluid from said first flow passage to said second flow passage in a predetermined proportion between said flow cell and said third flow passage when said valve is in its said first condition.

16. In a system for monitoring and maintaining a predetermined concentration of a material carried in a fluid body comprising fluid-receiving flow cell means, means for feeding the material and fluid together into and out of said flow cell means, means for establishing first and second volumetric conditions taken from said fluid body in said flow cell means, engery source means for transmitting energy via fluid in said flow cell means during each of said conditions, and means for detecting the degree of transmission through said flow cell means to define first and second levels of transmission via said flow cell means under said established conditions, means for correlating one of said levels relative to the other to provide a first measure of the concentration of said material in said fluid body, means for establishing a predetermined standard measure for a desired concentration of said material in said fluids, and means for adding additional material into said body in response to detecting a predetermined disparity between said first and said standard measures, said means for feeding the material and fluid into and out of said flow cell means includes means for filling and evacuating said flow cell means to provide successively each of said first and second volumetric conditions, the fluid in said flow cell means through which energy is transmitted during said second volumetric condition being substantially entirely gas.

17. In a system for monitoring the concentration of a material carried in a fluid body comprising means for circulating said fluid body within a substantially closed loop system, means for measuring the concentration of material carried in said fluid, the last named mens including means comparing the transmissivity of said fluid body in an associated flow cell arrangement under each of two conditions both of wihch are taken from said fluid body, one of said conditions providing an indication of the transmissivity of said fluid body in said arrangement and the other of said conditions providing an indication of transmissivity of said arrangement relatively unaffected by the presence or absence of said fluid body, means for establishing a predetermined standard of measurement for a desired concentration of said material in the fluid, and means for detecting disparity between said standard of measurement and the measured concentration of said material and serving to indicate the need for material to be added to said body.

18. The method of monitoring and maintaining a predetermined concentration of material carried in a fluid body comprising the steps of feeding said fluid body and the material therein into and out of flow cell means, measuring energy transmitted via said flow cell means in each of two states both of which are taken from said fluid body, said states being characterized by greater and lesser volumes of said fluid body present within said flow cell means, correlating the measured results for one state with the measured results for the other to provide an indication of the concentration of said material, establishing a predetermined indication of the concentration desired in said body, detecting a predetermined disparity between the first and last named indications of concentration, and introducing additional portions of said material into said body in response to said detecting.

19. The method of monitoring the concentration of a material carried in a fluid body comprising the steps of feeding the fluid body and the material therein into a flow cell, passing said fluid body and material from said flow cell, transmitting energy from a source via said flow cell to energy responsive means associated with said flow cell with said fluid body and material in said cell and transmitting energy from said source via said flow cell to energy responsive means associated therewith with said fluid body and material substantially removed from the path of said energy transmission, measuring the transmissivity of the cell with the fluid body therein and of the cell with the fluid body removed whereby first and second volumetric conditions are established from body, subtracting the transmissivity measured with said fluid removed from the transmissivity measured with the fluid present to provide an indication of the transmissivity of said fluid body.

20. The method of monitoring the concentration of a material carried in a fluid body comprising the steps of feeding the fluid body and the material therein into and out of first and second flow cells of substantially lesser and greater thicknesses respectively, transmitting energy from a source via each of said flow cells to energy responsive means associated with each said cell, maintaining the energy source at a predetermined level in response to the energy transmitted via said first flow cell, measuring the transmissivity of said first and second flow cells, correlating the measure of the transmissivity of said first cell relative to the transmissivity of said second cell to provide an indication of the transmissivity of said fluid body.

21. In a system for monitoring and maintaining a predetermined concentration of a material carried in a fluid body comprising fluid receiving flow cell means, means for feeding the material and fluid together into and out of said flow cell means, means for establishing first and second volumetric conditions taken from said fluid body in said flow cell means, energy source means for transmitting energy via fluid in said flow cell means during each of said conditions, and means for detecting the degree of transmission through said flow cell means to define first and second levels of transmission via said flow cell means under said established conditions, means for correlating one of said levels relative to the other to provide a first measure of the concentration of said material in said fluid body, means for establishing a predetermined standard measure for a desired concentration of said material in said fluids, and means for adding additional material into said body in response to detecting a predetermined disparity between said first and said standard measures, said fluid receiving flow cell means includes separate flow cells, each having different volumetric fluid capacities to provide said first and second volumetric conditions, the fluid in one of said flow cells during establishment of one of said volumetric conditions substantially unaffective on the transmissitivity of energy via said one flow cell.

22. A flow cell assembly comprising a mounting body, a plurality of flow cells carried by said body, said flow cells each comprising a pair of spaced transparent side walls, means for maintaining the side walls of each flow cell spaced apart in sealed relation to receive fluid in the spacing between said side walls, means for passing fluid into and out of the spacing between the walls of each said cell successively to provide first and second contained bodies of fluid in said cells respectively defined between the walls thereof, diversion channels formed in the walls of said cells for diverting a substantial portion of the flow of fluid through the cells, a light source carried by said body disposed to transmit light via each of said contained bodies of fluid, one of said contained bodies sufficiently thin relative to said side wall spacing whereby the light passing therethrough remains substantially unabsorbed by the presence of fluid in said one contained body.

23. A flow cell assembly according to claim 22 comprising means for detecting the transmissivity of said light passing through each of said cells, and means for subtracting a measure of the transmissivity of said light passing via one of said cells from a measure of the transmissivity of said light passing via the other of said cells to provide a measure of the transmissivity of said fluid.

24. A flow cell assembly comprising a plurality of flow cells, said flow cells each comprising a pair of spaced transparant side walls, means for maintaining the side walls of each flow cell spaced apart in sealed relation to receive fluid in the spacing between said side walls, means for passing fluid into and out of the spacing between the walls of each said cell successively to provide, respectively, first and second contained bodies of fluid of different volumetric capacities in said cells, light means disposed to transmit light via each of said contained bodies of fluid, one of said contained bodies sufficiently thin relative to said side wall spacing whereby the light passing therethrough remains substantially unaffected by the presence of fluid in said one contained body.

25. In a printing system having a frame, said system using liquid toner in a cyclic flow path comprising a toner fountain for developing pre-established latent electrostatic images carried on a web of recording material, said toner fountain having flow passages for passing said toner into and out of said fountain, pumping means in said path for circulating said toner along said flow path, a container for providing a supply of toner concentrate material for introduction into said path to adjust the concentration of said toner in said path, a resiliently mounted support plate on said frame and having a top surface to support said container, said pumping means secured to bottom surface of said plate, the vibratory action of said pumping means on said plate effective to stir the toner concentrate in said container.

* * * * *

UNITED STATES PATENT AND TRADEMARK OFFICE
CERTIFICATE OF CORRECTION

PATENT NO. : 4,222,497
DATED : September 16, 1980
INVENTOR(S) : WILLIAM A. LLOYD, HERMAN WONG, KEITH E. McFARLAND It is certified that error appears in the above-identified patent and that said Letters Patent are hereby corrected as shown below:

Column 10, line 24, cancel "from" and insert — relative to —.

Signed and Sealed this

Sixteenth Day of December 1980

[SEAL]

Attest:

SIDNEY A. DIAMOND

Attesting Officer

Commissioner of Patents and Trademarks